United States Patent
Hu et al.

(10) Patent No.: US 10,193,925 B2
(45) Date of Patent: Jan. 29, 2019

(54) ANTI-REPLAY METHOD AND APPARATUS

(71) Applicant: Huawei Technologies Co., Ltd., Shenzhen (CN)

(72) Inventors: Jun Hu, Nanjing (CN); Xinghua Guan, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 124 days.

(21) Appl. No.: 14/976,143

(22) Filed: Dec. 21, 2015

(65) Prior Publication Data
US 2016/0182453 A1 Jun. 23, 2016

(30) Foreign Application Priority Data
Dec. 22, 2014 (CN) .......................... 2014 1 0805460

(51) Int. Cl.
H04L 29/06 (2006.01)
(52) U.S. Cl.
CPC .................. H04L 63/164 (2013.01)
(58) Field of Classification Search
CPC .................................................... H04L 63/164
USPC ........................................................... 726/13
See application file for complete search history.

(56) References Cited

U.S. PATENT DOCUMENTS

| | | |
|---|---|---|
| 6,614,807 B1 | 9/2003 | Mikkila |
| 2004/0117653 A1 | 6/2004 | Shapira et al. |
| 2007/0165638 A1* | 7/2007 | Hasani ................... H04L 47/10 370/392 |
| 2008/0295163 A1* | 11/2008 | Kang ................... H04L 63/164 726/13 |
| 2009/0158417 A1* | 6/2009 | Khanna ............... H04L 63/1466 726/12 |
| 2012/0066772 A1 | 3/2012 | Burkley et al. |
| 2012/0272309 A1* | 10/2012 | Zhang ................ H04L 63/1466 726/13 |

OTHER PUBLICATIONS

Foreign Communication From a Counterpart Application, European Application No. 15197567.9, Extended European Search Report dated Mar. 21, 2016, 8 pages.

* cited by examiner

*Primary Examiner* — Khalil Naghdali
(74) *Attorney, Agent, or Firm* — Conely Rose, P.C.

(57) ABSTRACT

An anti-replay method and apparatus are provided. The same maximum agreed value is set at a transmit end and a receive end. The receive end receives an Internet Protocol Security (IPSec) packet, where the IPSec packet includes a sequence number, and acquires an upper limit value of an anti-replay sliding window. If the upper limit value of the anti-replay sliding window is the maximum agreed value, the receive end sets an interval of the anti-replay sliding window to M1 to M2, where M1 is a minimum value of the packet sequence number, and M2 is a sum of M1 and a size of the anti-replay sliding window. When a sequence number of a packet sent by the transmit end reaches a maximum value, a sequence number of a next sent packet starts from the minimum value, thereby resolving a problem that a packet is falsely discarded because of anti-replay.

15 Claims, 3 Drawing Sheets

ANTI-REPLAY METHOD AND APPARATUS

CROSS-REFERENCE TO RELATED APPLICATION

This application claims priority to Chinese Patent Application No. 201410805460.1, filed on Dec. 22, 2014, which is hereby incorporated by reference in its entirety.

TECHNICAL FIELD

Embodiments of the present disclosure relate to computer technologies, and in particular, to an anti-replay method and apparatus.

BACKGROUND

Internet Protocol Security (IPSec) is used to ensure security of end-to-end communication at an Internet Protocol (IP) layer.

IPSec provides secure communication between two endpoints, and the two endpoints are referred to as an IPSec transmit end and an IPSec receive end. An IPSec Security Association (SA) is an agreement on some elements between the IPSec transmit end and receive end, for example, which protocol is used, which protocol encapsulation mode is used, and which encryption algorithm is used. The IPSec SA has a life cycle, and ending of the life cycle is referred to as IPSec SA aging (invalidation). In the prior art, the life cycle of the IPSec SA is set based on time or is set based on traffic. Time based setting refers to that, starting from establishment of the IPSec SA, when a time period for which the SA survives reaches a set time period, the IPSec SA ages; and traffic based setting refers to that, when traffic processed using the IPSec SA reaches set traffic, the IPSec SA ages.

IPSec detects a replayed packet using an anti-replay sliding window mechanism. Before an IPSec SA ages, sequence numbers of packets sent by a transmit end increase successively. When a packet sequence number of a received packet falls in an interval of an anti-replay sliding window, the packet is received, and the anti-replay sliding window is kept unchanged; when a packet sequence number of a received packet falls on the right side of the interval of the anti-replay sliding window, the packet is received, and the anti-replay sliding window is moved to the right, such that an upper limit value of the anti-replay sliding window is the packet sequence number of the received packet; or when a packet sequence number of a received packet falls on the left side of the interval of the anti-replay sliding window, the received packet is discarded. After the IPSec SA is triggered to age, a sequence number of a packet sent by the transmit end starts from a minimum value, and the interval of the anti-replay sliding window is changed to [0, N−1], where N is a size of the anti-replay sliding window. However, according to the method in the prior art, when the sequence number of the packet of the transmit end reaches a maximum value, the packet sequence number is reversed and starts from the minimum value, and if the IPSec SA is not triggered to age, the interval of the anti-replay sliding window is [MAX−N, MAX], where MAX is the maximum value of the packet sequence number. After the receive end receives a reversed packet sequence number, a received packet is discarded because the packet sequence number is on the left side of the anti-replay sliding window, which causes that the packet is falsely discarded because of anti-replay.

SUMMARY

Embodiments of the present disclosure provide an anti-replay method and apparatus, so as to resolve a problem that a packet is falsely discarded because of anti-replay.

In a first aspect, an anti-replay method is provided, including receiving an IPSec packet, where the IPSec packet includes a sequence number; acquiring an upper limit value of an anti-replay sliding window; and if the upper limit value of the anti-replay sliding window is a maximum agreed value, setting an interval of the anti-replay sliding window to M1 to M2, where M1 is a minimum value of the packet sequence number, M2 is a sum of M1 and a size of the anti-replay sliding window, and M1 is an integer greater than or equal to 0.

With reference to the first aspect, in a first possible implementation manner of the first aspect, the method further includes, if the upper limit value of the anti-replay sliding window is not the maximum agreed value, when the sequence number of the IPSec packet is in the anti-replay sliding window, storing the IPSec packet; when the sequence number of the IPSec packet is on the right side of the anti-replay sliding window, storing the IPSec packet, and moving the anti-replay sliding window to the right, such that the upper limit value of the anti-replay sliding window is the sequence number of the IPSec packet; or when the sequence number of the IPSec packet is on the left side of the anti-replay sliding window, discarding the IPSec packet.

With reference to the first aspect or the first possible implementation manner of the first aspect, in a second possible implementation manner of the first aspect, before the acquiring an upper limit value of an anti-replay sliding window, the method further includes negotiating the maximum agreed value with a transmit end of the IPSec packet, where the maximum agreed value is a maximum value of the sequence number of the IPSec packet sent by the transmit end.

With reference to the first aspect, the first possible implementation manner of the first aspect, or the second possible implementation manner of the first aspect, in a third possible implementation manner of the first aspect, the maximum agreed value is $2^n-1$, where n is a quantity of digits of the packet sequence number.

In a second aspect, an anti-replay apparatus is provided, including a receiving module configured to receive an IPSec packet, where the IPSec packet includes a sequence number; an acquiring module configured to acquire an upper limit value of an anti-replay sliding window; and a processing module configured to, if the upper limit value of the anti-replay sliding window is a maximum agreed value, set an interval of the anti-replay sliding window to M1 to M2, where M1 is a minimum value of the packet sequence number, M2 is a sum of M1 and a size of the anti-replay sliding window, and M1 is an integer greater than or equal to 0.

With reference to the second aspect, in a first possible implementation manner of the second aspect, the processing module of the apparatus is further configured to, if the upper limit value of the anti-replay sliding window is not the maximum agreed value, when the sequence number of the IPSec packet is in the anti-replay sliding window, store the IPSec packet; when the sequence number of the IPSec packet is on the right side of the anti-replay sliding window, store the IPSec packet, and move the anti-replay sliding window to the right, such that the upper limit value of the anti-replay sliding window is the sequence number of the IPSec packet; or when the sequence number of the IPSec packet is on the left side of the anti-replay sliding window, discard the IPSec packet.

With reference to the second aspect or the first possible implementation manner of the second aspect, in a second possible implementation manner of the second aspect, the processing module is further configured to negotiate the maximum agreed value with a transmit end of the IPSec packet, where the maximum agreed value is a maximum value of the sequence number of the IPSec packet sent by the transmit end.

With reference to the second aspect, the first possible implementation manner of the second aspect, or the second possible implementation manner of the second aspect, in a third possible implementation manner of the second aspect, the maximum agreed value is $2^n-1$, where n is a quantity of digits of the packet sequence number.

According to the anti-replay method and apparatus provided by the embodiments of the present disclosure, a same maximum agreed value is set at a transmit end and a receive end, the receive end receives an IPSec packet, where the IPSec packet includes a sequence number, and acquires an upper limit value of an anti-replay sliding window; and if the upper limit value of the anti-replay sliding window is the maximum agreed value, the receive end sets an interval of the anti-replay sliding window to M1 to M2, where M1 is a minimum value of the packet sequence number, and M2 is a sum of M1 and a size of the anti-replay sliding window. When a sequence number of a packet sent by the transmit end reaches a maximum value, a sequence number of a next sent packet starts from the minimum value, thereby resolving a problem that a packet is falsely discarded because of anti-replay.

BRIEF DESCRIPTION OF DRAWINGS

To describe the technical solutions in the embodiments of the present disclosure more clearly, the following briefly introduces the accompanying drawings required for describing the embodiments or the prior art. The accompanying drawings in the following description show merely some embodiments of the present disclosure, and persons of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by persons of ordinary skill in the art based on the embodiments of the present disclosure without creative efforts shall fall within the protection scope of the present disclosure.

The present disclosure is mainly to resolve a problem that a received packet is falsely discarded because of anti-replay because before a life cycle of an IPSec SA that is set based on time or set based on traffic ends, a packet sequence number reaches a maximum value of the packet sequence number and is reversed, and a reversed packet sequence number cannot fall in an interval of an anti-replay sliding window or on the right side of the anti-replay sliding window. In the present disclosure, a same maximum agreed value is set at a transmit end and a receive end, the receive end receives an IPSec packet, where the IPSec packet includes a sequence number, and acquires an upper limit value of an anti-replay sliding window; and if the upper limit value of the anti-replay sliding window is the maximum agreed value, the receive end sets an interval of the anti-replay sliding window to M1 to M2, where M1 is a minimum value of the packet sequence number, and M2 is a sum of M1 and a size of the anti-replay sliding window, that is, M2=M1+N, where N is the size of the anti-replay sliding window. When a sequence number of a packet sent by the transmit end reaches a maximum value, a sequence number of a next sent packet starts from the minimum value, thereby resolving the problem that a packet is falsely discarded because of anti-replay.

In the following embodiments of the present disclosure, a receive end refers to an IPSec receive end, and a transmit end refers to an IPSec transmit end.

The technical solutions of the present disclosure are described below in detail using specific embodiments. The following several specific embodiments may be combined with each other, and a same or similar concept or process may not be described again in some embodiments.

Figure 1:
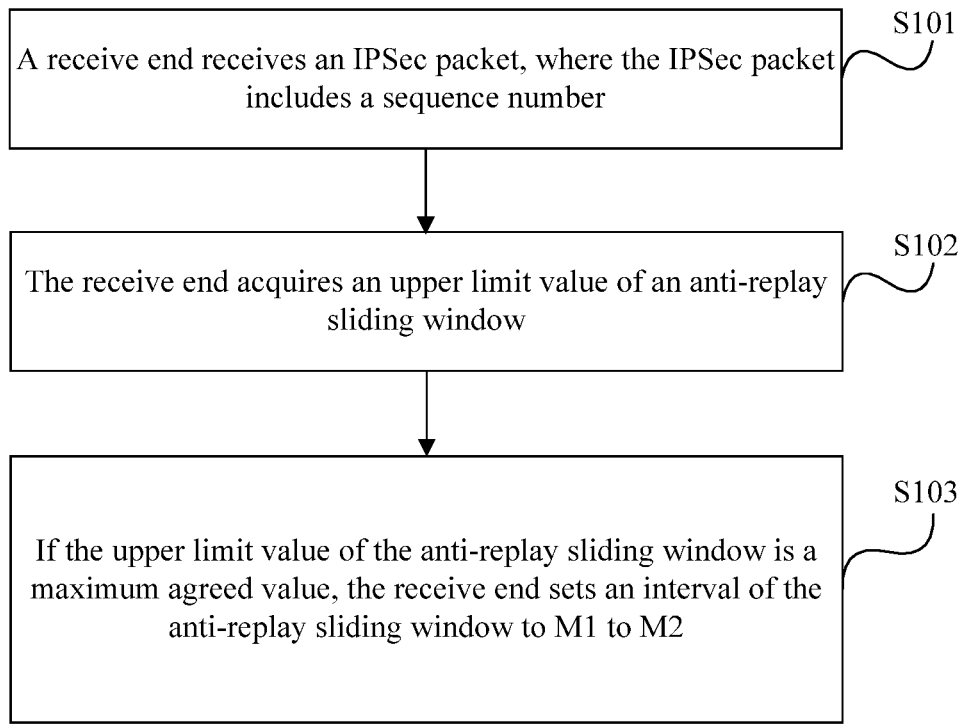
FIG. 1 is a schematic flowchart of an anti-replay method according to an embodiment of the present disclosure.

FIG. 1 is a schematic flowchart of an anti-replay method according to an embodiment of the present disclosure. As shown in FIG. 1, the method in this embodiment is as follows.

S101: A receive end receives an IPSec packet, where the IPSec packet includes a sequence number.

S102: The receive end acquires an upper limit value of an anti-replay sliding window.

Figure 2:
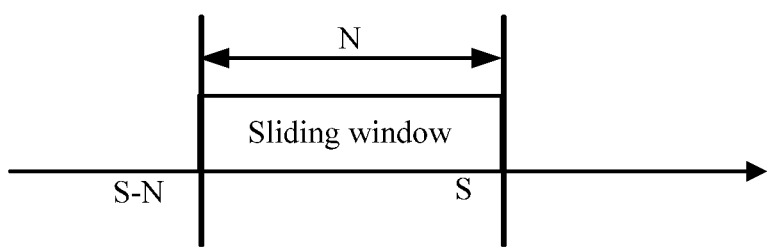
FIG. 2 is a schematic diagram of an anti-replay sliding window according to the present disclosure.

During a sliding process of the anti-replay sliding window, a size of the window is always fixed. As shown in FIG. 2, FIG. 2 is a schematic diagram of an anti-replay sliding window according to the present disclosure. A size of the anti-replay sliding window is N. In the embodiments of the present disclosure, a value of a left endpoint of the anti-replay sliding window is referred to as a lower limit value of the anti-replay sliding window, a value of a right endpoint of the anti-replay sliding window is referred to as the upper limit value of the anti-replay sliding window, and a difference between the upper limit value and the lower limit value is the size of the anti-replay sliding window.

S103: If the upper limit value of the anti-replay sliding window is a maximum agreed value, the receive end sets an interval of the anti-replay sliding window to M1 to M2.

The maximum agreed value may be a manually configured anti-replay sequence number, and the maximum agreed values at a transmit end and the receive end must be consistent. For example, for a packet sequence number of 32 digits, the maximum agreed value may be set to 0xFFFFFFFF, and it is understandable that, the maximum agreed value may also be a numerical value less than 0xFFFFFFFF, provided that settings at the transmit end and the receive end are consistent. Generally, the maximum agreed value is $2^n-1$, where n is a quantity of digits of the packet sequence number. The maximum agreed value may be set according to actual needs, and is not limited in the present disclosure.

Before S102 is performed, the method further includes negotiating, by the receive end, the maximum agreed value with the transmit end, where the maximum agreed value is a maximum value of the sequence number of the packet sent by the transmit end.

M1 is a minimum value of the packet sequence number, and M2 is a sum of M1 and the size of the anti-replay sliding window. That is, M2=M1+N, where N is the size of the anti-replay sliding window.

M1 is generally 0, but the packet sequence number may not start from 0. M1 may be set according to actual needs, and is not limited in the present disclosure.

Using a packet sequence number of 32 digits as an example, assuming that the maximum agreed value is 0xFFFFFFFF, and that the minimum value of the packet sequence number is 0, when the upper limit value of the anti-replay sliding window is 0xFFFFFFFF, it is triggered to change the interval of the anti-replay sliding window to [0, N−1]; and when a sequence number of a packet sent by the transmit end is 0xFFFFFFFF, a sequence number of a next sent packet is 0. Therefore, when the sequence number of the packet sent by the transmit end is reversed and starts from the minimum value, the sequence number of the packet can still fall in the interval of the anti-replay sliding window of the receive end, thereby avoiding a problem that a packet is falsely discarded because of anti-replay.

In this embodiment, a same maximum agreed value is set at a transmit end and a receive end, the receive end receives an IPSec packet, where the IPSec packet includes a sequence number, and acquires an upper limit value of an anti-replay sliding window; and if the upper limit value of the anti-replay sliding window is the maximum agreed value, the receive end sets an interval of the anti-replay sliding window to M1 to M2, where M1 is a minimum value of the packet sequence number, and M2=M1+N, where N is a size of the anti-replay sliding window. When a sequence number of a packet sent by the transmit end reaches a maximum value, a sequence number of a next sent packet starts from the minimum value, thereby resolving a problem that a packet is falsely discarded because of anti-replay.

Based on the embodiment show in FIG. 1, if the upper limit value of the anti-replay sliding window is not the maximum agreed value, the method further includes the following several cases: when the sequence number of the IPSec packet is in the anti-replay sliding window, storing the IPSec packet; when the sequence number of the IPSec packet is on the right side of the anti-replay sliding window, storing the IPSec packet, and moving the anti-replay sliding window to the right, such that the upper limit value of the anti-replay sliding window is the sequence number of the IPSec packet; for example, the sequence number of the IPSec packet is S, where S is less than or equal to the maximum agreed value, then the IPSec packet is stored, and the anti-replay sliding window is moved to the right, such that the upper limit value of the anti-replay sliding window is S, and a lower limit value of the anti-replay sliding window is S−N, where N is the size of the anti-replay sliding window, as shown in FIG. 2; and when the sequence number of the IPSec packet is on the left side of the anti-replay sliding window, discarding the IPSec packet; the sequence number of the IPSec packet is on the left side of the anti-replay sliding window, and therefore it is considered that the packet is already decapsulated before, and that the packet is a replayed packet; decapsulation on a replayed packet is of no practical use, and a decapsulation process consumes a large quantity of resources of a device, which deteriorates service availability and actually constitutes a denial of service (DOS) attack; a replayed packet is discarded using an anti-replay sliding window mechanism, which can reduce device resource consumption.

Correspondingly, the transmit end of the IPSec packet performs the following steps: determining whether the sequence number of the sent packet is the maximum agreed value; if yes, performing step A; if not, performing step B.

Step A: If the sequence number of the sent packet is the maximum agreed value, set a sequence number of a next sent packet to the minimum value.

Step B: If the sequence number of the sent packet is not the maximum agreed value, add 1 to the sequence number, to obtain a sequence number of a next sent packet.

In this embodiment, a maximum agreed value set at a transmit end of an IPSec packet is the same as that at a receive end, and when sending the IPSec packet, the transmit end determines whether a sequence number of the IPSec packet is the maximum agreed value. If the sequence number of the IPSec packet is the maximum agreed value, a sequence number of a next sent IPSec packet starts from a minimum value. If the sequence number of the IPSec packet is not the maximum agreed value, 1 is added to the sequence number, to obtain a sequence number of a next sent packet. Because the maximum agreed value set at the transmit end is the same as that at the receive end, and an upper limit value of an anti-replay sliding window of the receive end is the maximum agreed value, the receive end can implement the anti-replay method shown in FIG. 1 of the present disclosure, thereby resolving a problem that a packet is falsely discarded because of anti-replay.

Figure 3:
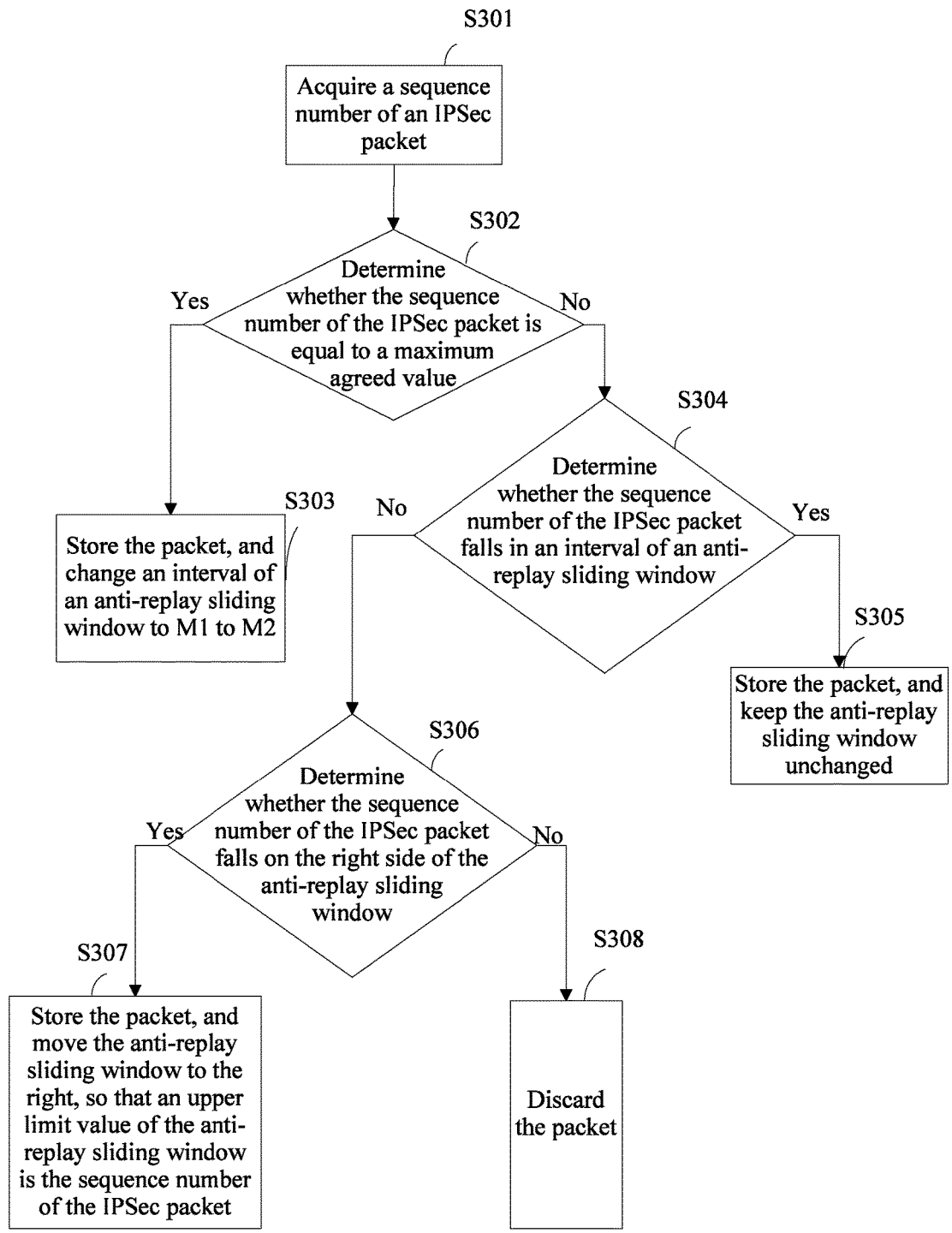
FIG. 3 is a schematic flowchart of another anti-replay method according to an embodiment of the present disclosure.

FIG. 3 is a schematic flowchart of another anti-replay method according to an embodiment of the present disclosure. This embodiment is executed by a receive end. As shown in FIG. 3, the following steps may occur.

S301: Acquire a sequence number of an IPSec packet.

S302: Determine whether the sequence number of the IPSec packet is equal to a maximum agreed value; if yes, perform S303; and if not, perform S304.

S303: Store the packet, and change an interval of an anti-replay sliding window to M1 to M2, where M1 is a minimum value of the packet sequence number, and M2=M1+N, where N is a size of the anti-replay sliding window.

S304: Determine whether the sequence number of the IPSec packet falls in the interval of the anti-replay sliding window; if yes, perform S305; and if not, perform S306.

S305: Store the packet, and keep the anti-replay sliding window unchanged.

S306: Determine whether the sequence number of the IPSec packet falls on the right side of the anti-replay sliding window; if yes, perform S307; and if not, perform S308.

S307: Store the packet, and move the anti-replay sliding window to the right, such that an upper limit value of the anti-replay sliding window is the sequence number of the IPSec packet.

S308: Discard the packet.

Figure 4:
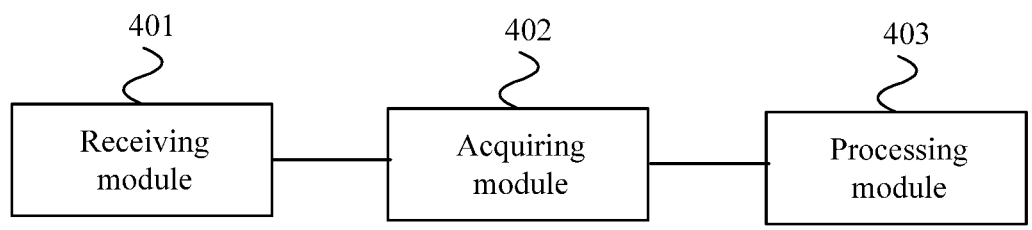
FIG. 4 is a schematic structural diagram of an anti-replay apparatus according to an embodiment of the present disclosure.

FIG. 4 is a schematic structural diagram of an anti-replay apparatus according to an embodiment of the present disclosure. The apparatus in this embodiment is deployed at a receive end. The apparatus in this embodiment includes a receiving module 401, an acquiring module 402, and a processing module 403, where the receiving module 401 is configured to receive an IPSec packet, where the IPSec packet includes a sequence number; the acquiring module 402 is configured to acquire an upper limit value of an anti-replay sliding window; and the processing module 403 is configured to, if the upper limit value of the anti-replay sliding window is a maximum agreed value, set an interval of the anti-replay sliding window to M1 to M2, where M1 is a minimum value of the packet sequence number, M2 is a sum of M1 and a size of the anti-replay sliding window, and M1 is an integer greater than or equal to 0.

In the foregoing embodiment, the processing module 403 is further configured to, if the upper limit value of the anti-replay sliding window is not the maximum agreed value, when the sequence number of the IPSec packet is in the anti-replay sliding window, store the IPSec packet; when the sequence number of the IPSec packet is on the right side of the anti-replay sliding window, store the IPSec packet, and move the anti-replay sliding window to the right, such that the upper limit value of the anti-replay sliding window is the sequence number of the IPSec packet; or when the sequence number of the IPSec packet is on the left side of the anti-replay sliding window, discard the IPSec packet.

In the foregoing embodiment, the processing module 403 is further configured to negotiate the maximum agreed value with a transmit end of the IPSec packet, where the maximum agreed value is a maximum value of the sequence number of the IPSec packet sent by the transmit end.

In the foregoing embodiment, the maximum agreed value is $2^n-1$, where n is a quantity of digits of the packet sequence number.

In this embodiment, a same maximum agreed value is set at a transmit end and a receive end, the receiving module at the receive end receives an IPSec packet, where the IPSec packet includes a sequence number, the acquiring module acquires an upper limit value of an anti-replay sliding window; and if the upper limit value of the anti-replay sliding window is the maximum agreed value, the processing module sets an interval of the anti-replay sliding window to M1 to M2, where M1 is a minimum value of the packet sequence number, and M2=M1+N, where N is a size of the anti-replay sliding window. When a sequence number of a packet sent by the transmit end reaches a maximum value, a sequence number of a next sent packet starts from the minimum value, thereby resolving a problem that a packet is falsely discarded because of anti-replay.

Figure 5:
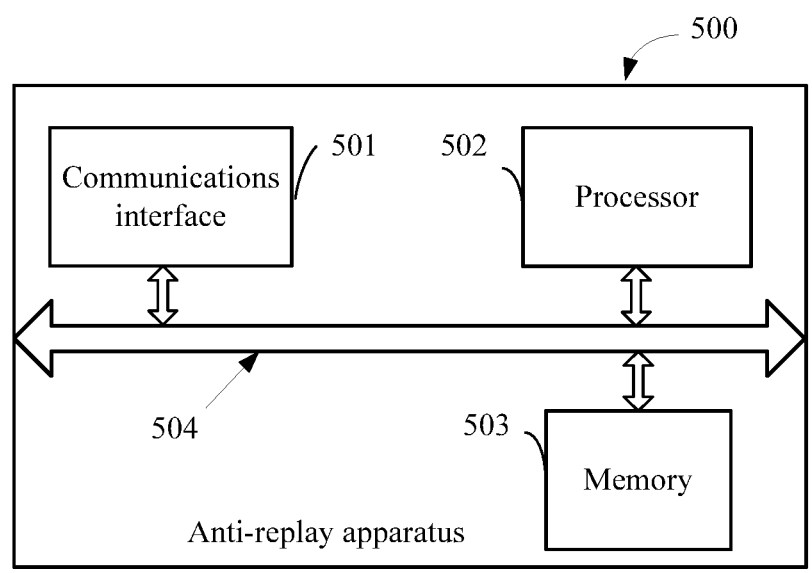
FIG. 5 is a schematic structural diagram of another anti-replay apparatus according to an embodiment of the present disclosure.

FIG. 5 is a schematic structural diagram of another anti-replay apparatus according to an embodiment of the present disclosure. The anti-replay apparatus is deployed at a receive end. As shown in FIG. 5, the anti-replay apparatus 500 includes a communications interface 501, a memory 503, and a processor 502, where the communications interface 501, the processor 502, and the memory 503 are connected to each other by a bus 504. The bus 504 may be a peripheral component interconnect (PCI) bus, an extended industry standard architecture (EISA) bus, or the like. The bus may be classified into an address bus, a data bus, a control bus, and the like. For ease of indication, the bus 504 is indicated using only one bold line in FIG. 5, but it does not indicate that there is only one bus or one type of bus.

The communications interface 501 is configured to communicate with a transmit end. The memory 503 is configured to store a program. The program may include program code, where the program code includes computer operation instructions. The memory 503 may include a random access memory (RAM), and may further include a non-volatile memory, for example, at least one magnetic disk storage.

The processor 502 executes the program stored by the memory 503, to implement the anti-replay method shown in FIG. 1 or FIG. 3 of the present disclosure, where the method includes receiving an IPSec packet, where the IPSec packet includes a sequence number; acquiring an upper limit value of an anti-replay sliding window; and if the upper limit value of the anti-replay sliding window is a maximum agreed value, setting an interval of the anti-replay sliding window to M1 to M2, where M1 is a minimum value of the packet sequence number, M2 is a sum of M1 and a size of the anti-replay sliding window, and M1 is an integer greater than or equal to 0.

The method may further include negotiating the maximum agreed value with the transmit end, where the maximum agreed value is a maximum value of the sequence number of the IPSec packet sent by the transmit end.

The foregoing processor 502 may be a general purpose processor, which includes a central processing unit (CPU), a network processor (NP), and the like; or may be a digital signal processor (DSP), an application specific integrated circuit (ASIC), a field programmable gate array (FPGA) or another programmable logic device, a discrete gate or transistor logic device, or a discrete hardware component.

In this embodiment of the present disclosure, a same maximum agreed value is set at a transmit end and a receive end, and the processor receives an IPSec packet, where the IPSec packet includes a sequence number, and acquires an upper limit value of an anti-replay sliding window; and if the upper limit value of the anti-replay sliding window is the maximum agreed value, the processor sets an interval of the anti-replay sliding window to M1 to M2, where M1 is a minimum value of the packet sequence number, and M2=M1+N, where N is a size of the anti-replay sliding window. When a sequence number of a packet sent by the transmit end reaches a maximum value, a sequence number of a next sent packet starts from the minimum value, thereby resolving a problem that a packet is falsely discarded because of anti-replay.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a read-only memory (ROM), a RAM, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, as long as such modifications or replacements do not cause the essence of corresponding technical solutions to depart from the scope of the technical solutions of the embodiments of the present disclosure.

What is claimed is:

1. An anti-replay method used in an Internet Protocol Security (IPSec) receive end, wherein the IPSec receive end is configured to communicate with an IPSec transmit end using an IPSec Security Association (SA) that is set based on time or traffic, the anti-replay method comprising:

receiving an IPSec packet from the IPSec transmit end, wherein the IPSec packet comprises a sequence number;

determining whether an upper limit value of an anti-replay sliding window of the IPSec receive end is equal to a maximum agreed value, wherein the maximum agreed value is a maximum value of the sequence number of the IPSec packet;

if the upper limit value of the anti-replay sliding window is equal to the maximum agreed value:
   storing the IPSec packet; and
   setting an interval of the anti-replay sliding window from M1 to M2 before a life cycle of the IPSec SA ends, wherein M1 is a minimum value of the sequence number, wherein M2 is a sum of M1 and a size of the anti-replay sliding window, and wherein M1 is an integer greater than or equal to 0; and if the upper limit value of the anti-replay sliding window is not equal to the maximum agreed value:
   storing the IPSec packet when the sequence number of the IPSec packet is in the anti-replay sliding window;
   storing the IPSec packet and moving the anti-replay sliding window to right such that the upper limit value of the anti-replay sliding window is the sequence number of the IPSec packet when the sequence number of the IPSec packet is on a right side of the anti-replay sliding window; and
   discarding the IPSec packet when the sequence number of the IPSec packet is on a left side of the anti-replay sliding window.

2. The anti-relay method of claim 1, wherein before acquiring the upper limit value of the anti-replay sliding window, the method further comprises negotiating the maximum agreed value with the IPSec transmit end.

3. The anti-replay method of claim 1, wherein the maximum agreed value is $2^n-1$, and wherein n is a quantity of digits of the sequence number.

4. The anti-replay method of claim 1, further comprising determining whether the sequence number of the IPSec packet falls in an interval of the anti-replay sliding window subsequent to determining that the upper limit value of an anti-replay sliding window of the IPSec receive end is not equal to the maximum agreed value.

5. The anti-replay method of claim 4, further comprising determining whether the sequence number of the IPSec packet falls on the right side of the anti-replay sliding window subsequent to determining that the sequence number of the IPSec packet does not fall in the interval of the anti-replay sliding window.

6. An anti-replay apparatus used in an Internet Protocol Security (IPSec) receive end, wherein the IPSec receive end is configured to communicate with an IPSec transmit end using an IPSec Security Association (SA) that is set based on time or traffic, the anti-replay apparatus comprising:
   a receiver configured to receive an IPSec packet from the IPSec transmit end, wherein the IPSec packet comprises a sequence number; and
   a processor coupled to the receiver and configured to:
     determine whether an upper limit value of an anti-replay sliding window of the IPSec receive end is equal to a maximum agreed value, wherein the maximum agreed value is a maximum value of the sequence number of the IPSec packet;
     if the upper limit value of the anti-replay sliding window is the maximum agreed value, set an interval of the anti-replay sliding window from M1 to M2 before a life cycle of the IPSec SA ends, wherein M1 is a minimum value of the sequence number, wherein M2 is a sum of M1 and a size of the anti-replay sliding window, and wherein M1 is an integer greater than or equal to 0; and
     if the upper limit value of the anti-replay sliding window is not the maximum agreed value:
       store the IPSec packet when the sequence number of the IPSec packet is in the anti-replay sliding window;
       store the IPSec packet and moving the anti-replay sliding window to right such that the upper limit value of the anti-replay sliding window is the sequence number of the IPSec packet when the sequence number of the IPSec packet is on a right side of the anti-replay sliding window; and
       discard the IPSec packet when the sequence number of the IPSec packet is on a left side of the anti-replay sliding window.

7. The anti-replay apparatus of claim 6, wherein the processor is further configured to negotiate the maximum agreed value with the IPSec transmit end.

8. The anti-replay apparatus claim 6, wherein the maximum agreed value is $2^n-1$, and wherein n is a quantity of digits of the sequence number.

9. The anti-replay apparatus of claim 6, wherein the processor is further configured to whether the sequence number of the IPSec packet falls in an interval of the anti-replay sliding window subsequent to determining that the upper limit value of an anti-replay sliding window of the IPSec receive end is not equal to the maximum agreed value.

10. The anti-replay apparatus of claim 9, wherein the processor is further configured to determine whether the sequence number of the IPSec packet falls on the right side of the anti-replay sliding window subsequent to determining that the sequence number of the IPSec packet does not fall in the interval of the anti-replay sliding window.

11. An anti-replay apparatus used as an Internet Protocol Security (IPSec) receive end, wherein the IPSec receive end is configured to communicate with an IPSec transmit end using an IPSec Security Association (SA) that is set based on time or traffic, the anti-replay apparatus comprising:
   a processor; and
   a memory coupled to the processor and storing computer operation instructions,
   wherein the processor is configured to execute the computer operation instructions to perform operations of:
     receiving an IPSec packet from the IPSec transmit end, wherein the IPSec packet comprises a sequence number;
     determining whether an upper limit value of an anti-replay sliding window of the IPSec receive end is equal to a maximum agreed value, wherein the maximum agreed value is a maximum value of the sequence number of the IPSec packet;
     if the upper limit value of the anti-replay sliding window is the maximum agreed value, setting an interval of the anti-replay sliding window from M1 to M2 before a life cycle of the IPSec SA ends, wherein M1 is a minimum value of the sequence number, wherein M2 is a sum of M1 and a size of the anti-replay sliding window, and wherein M1 is an integer greater than or equal to 0; and
     if the upper limit value of the anti-replay sliding window is not the maximum agreed value:
       storing the IPSec packet when the sequence number of the IPSec packet is in the anti-replay sliding window;

storing the IPSec packet and moving the anti-replay sliding window to right such that the upper limit value of the anti-replay sliding window is the sequence number of the IPSec packet when the sequence number of the IPSec packet is on a right side of the anti-replay sliding window; and discarding the IPSec packet when the sequence number of the IPSec packet is on a left side of the anti-replay sliding window.

12. The anti-replay apparatus of claim 11, wherein before acquiring the upper limit value of the anti-replay sliding window, the processor is further configured to perform operation of negotiating the maximum agreed value with the IPSec transmit end.

13. The anti-replay apparatus of claim 11, wherein the maximum agreed value is $2^n-1$, and wherein n is a quantity of digits of the sequence number.

14. The anti-replay apparatus of claim 11, wherein the processor is further configured to determine whether the sequence number of the IPSec packet falls in an interval of the anti-replay sliding window subsequent to determining that the upper limit value of an anti-replay sliding window of the IPSec receive end is not equal to the maximum agreed value.

15. The anti-replay apparatus of claim 14, wherein the processor is further configured to determine whether the sequence number of the IPSec packet falls on the right side of the anti-replay sliding window subsequent to determining that the sequence number of the IPSec packet does not fall in the interval of the anti-replay sliding window.

* * * * *

UNITED STATES PATENT AND TRADEMARK OFFICE
CERTIFICATE OF CORRECTION

PATENT NO. : 10,193,925 B2
APPLICATION NO. : 14/976143
DATED : January 29, 2019
INVENTOR(S) : Jun Hu and Xinghua Guan Page 1 of 1

It is certified that error appears in the above-identified patent and that said Letters Patent is hereby corrected as shown below:

On the Title Page

Item (30): "201410805460" should read "201410805460.1"

In the Specification

Column 9, Line 28: "anti-relay" should read "anti-replay"

Signed and Sealed this
Nineteenth Day of March, 2019

Andrei Iancu
*Director of the United States Patent and Trademark Office*